United States Patent
Licht et al.

(10) Patent No.: US 11,724,939 B2
(45) Date of Patent: Aug. 15, 2023

(54) APPARATUS, SYSTEM AND METHOD FOR MAKING CARBANOGEL BUCKYPAPER FROM CARBON DIOXIDE AND PRODUCTS THEREOF

(71) Applicant: Direct Air Capture, LLC, Venice, FL (US)

(72) Inventors: Stuart Licht, Venice, FL (US); Gad Licht, Venice, FL (US)

(73) Assignee: Direct Air Capture, LLC, Venice, FL (US)

( * ) Notice: Subject to any disclaimer, the term of this patent is extended or adjusted under 35 U.S.C. 154(b) by 0 days.

(21) Appl. No.: 17/749,407

(22) Filed: May 20, 2022

(65) Prior Publication Data

US 2022/0371894 A1    Nov. 24, 2022

Related U.S. Application Data

(60) Provisional application No. 63/191,122, filed on May 20, 2021.

(51) Int. Cl.

| C01B 32/154 | (2017.01) |
| C25B 1/50 | (2021.01) |
| C25B 1/135 | (2021.01) |
| C25B 9/09 | (2021.01) |
| B28B 3/02 | (2006.01) |
| C09K 5/14 | (2006.01) |

(52) U.S. Cl.
CPC ........... *C01B 32/154* (2017.08); *B28B 3/025* (2013.01); *C09K 5/14* (2013.01); *C25B 1/135* (2021.01); *C25B 1/50* (2021.01); *C25B 9/09* (2021.01)

(58) Field of Classification Search
CPC ..... C01B 32/154; C01B 32/158; C01B 32/16; C01B 32/168; C01B 32/18; C01B 32/182; C01B 32/184; C25B 1/135
See application file for complete search history.

(56) References Cited

FOREIGN PATENT DOCUMENTS

| WO | 2018156642 A1 | 8/2018 |
| WO | 2020092384 A1 | 5/2020 |
| WO | 2020092449 A1 | 5/2020 |
| WO | 2022031949 A1 | 2/2022 |

OTHER PUBLICATIONS

International Search Report and Written Opinion dated Sep. 14, 2022 for corresponding PCT Application No. PCTUS2022030204 filed May 20, 2022 (11 pages).

*Primary Examiner* — Ciel P Contreras
(74) *Attorney, Agent, or Firm* — Chamberlain, Hrdlicka, White, Williams & Aughtry

(57) ABSTRACT

Embodiments of the present disclosure relate to a process for making a carbanogel buckypaper product. Such carbanogel buckypaper product may be imparted with enhanced properties as compared to other buckypaper products. In some embodiments of the present disclosure, the carbanogel can be generated by an electrolysis process that can transform a carbon-containing gas into a carbon nanomaterial.

23 Claims, 7 Drawing Sheets

APPARATUS, SYSTEM AND METHOD FOR MAKING CARBANOGEL BUCKYPAPER FROM CARBON DIOXIDE AND PRODUCTS THEREOF

CROSS-REFERENCE TO RELATED APPLICATIONS

This application claims priority to and the benefit of U.S. Provisional Patent Application Ser. No. 63/191,122 filed on May 20, 2021, which is hereby incorporated herein by reference in its entirety.

TECHNICAL FIELD

The present disclosure relates to manufacturing a product using an electrolysis process. In particular, the present disclosure relates to methods of making a carbanogel product from carbon dioxide that is split using the electrolysis process.

BACKGROUND

Buckypapers are sheets of carbon nanomaterials (CNMs). The majority of studies report on buckypapers composed of carbon nanotubes. Additionally, buckypapers may be composed of graphene, graphene oxide and carbon nano-onions and have been studied.

Buckypapers have demonstrated diverse and enhanced physical and chemical properties including, but not limited to: high tensile strength; high electrical conductivity; high thermal conductivity; electronic shielding; magnetic shielding; electrical charge storage for use in batteries, fuel cells and capacitors; catalytic activity; reduced friction; and, targeted therapeutic activity. Many of these properties originate from the planar $sp^2$ bonded carbons of graphene in different geometric arrangements including single or concentric, multiple walls of graphene cylinders (carbon nanotubes, CNTs), carbon nanofibers, single layered or multilayered (nano-platelets) graphene, hollow or concentric (nano-onion) buckyball spheres, and three-dimensional geometries such as graphene nano-scaffolds.

The acceptance and widespread use of buckypaper had been hampered by the high cost of manufacturing the CNM components and the associated high carbon-footprint. The manufacturing processes include a chemical vapor deposition (CVD) process that is conventionally used in the commercial production of CNMs. Currently, the price of CNMs such as CNTs, graphene and carbon nano-onions are in the range of $100,000 USD to $10 million per tonne. Comparatively, steel is priced at $400 to $700 per tonne.

In a typical buckypaper formation process the CNMs are first added to a liquid, then sonicated to provide a homogenous dispersion, and the liquid is filtered and/or dried off leaving the buckypaper formed as a solid sheet of dispersed CNMs.

As such, new approaches for commercial production of buckypaper that address the high costs and the associated high carbon-footprint are desirable.

SUMMARY

The embodiments of the present disclosure relate to a process for manufacturing, or otherwise producing, sheets of carbon nanomaterials (CNMs), referred to herein as a buckypaper product, from carbanogel where such processes may also lower $CO_2$ levels. The process comprises the steps of forming a CNM containing carbanogel product by a molten electrolytic process for splitting of carbon dioxide ($CO_2$); recovering the carbanogel product pressing, sieving, peeling and/or crushing the carbanogel product or a combination thereof; transferring, the crushed carbanogel product with or without filtering, and without or without chemical, thermal, mechanical treatment, or electrochemical treatment to a mold; and compressing the carbanogel product within the mold to form the buckypaper product.

Some embodiments of the present disclosure relate to a carbanogel buckypaper (CB) that comprises carbon nanomaterials (CNM); and an electrolyte.

Some embodiments of the present disclosure relate to a system for making a carbanogel buckypaper. The system comprises: an apparatus for performing an electrolysis process that splits carbon dioxide ($CO_2$) within a molten electrolyte for producing a carbanogel, wherein the carbanogel comprises carbon nanomaterials (CNM) and electrolyte; a mold; and a compression unit.

BRIEF DESCRIPTION OF THE DRAWING

These and other features of the present disclosure will become more apparent in the following detailed description in which reference is made to the appended drawings.

FIG. 7 shows photographs of scanning electron microscope images of a carbanogel made according to the embodiments of the present disclosure, wherein FIG. 7A shows an image of ×730 magnification; and, FIG. 7B shows an image of ×8600 magnification.

DETAILED DESCRIPTION

Figure 1:
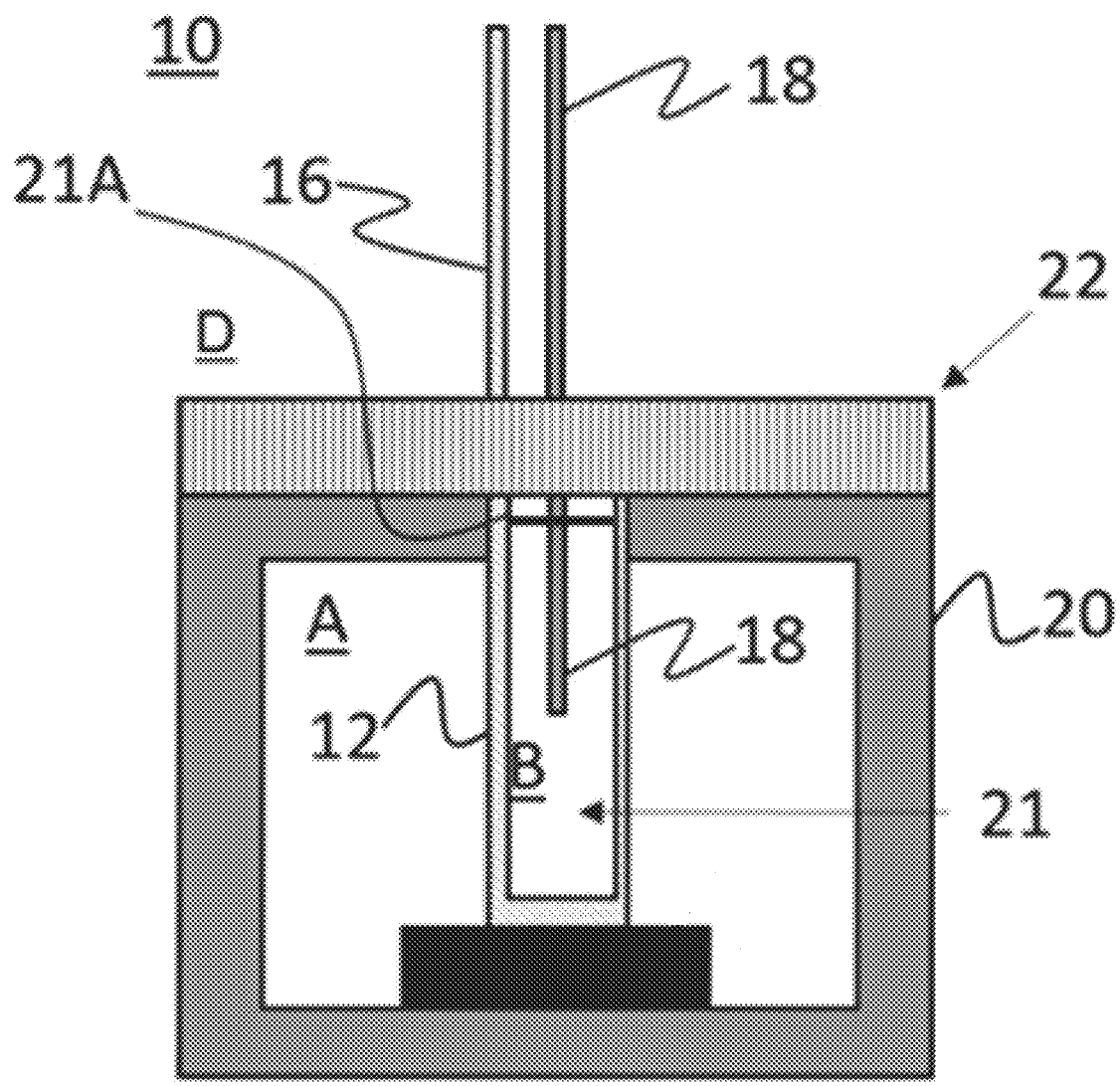
FIG. 1 is a schematic of an apparatus for making carbanogel product, for use in embodiments of the present disclosure.

Since 2009, the energy efficient conversion of $CO_2$ to carbon and oxidation by molten carbonate electrolysis has been known. Subsequently, the chemical conversion of $CO_2$ to a variety of graphitic carbon nanomaterials (CNMs) was demonstrated. These graphitic CNMs are valuable due to a long-term stability and these materials having useful properties such as ultra-high strength, high electrical conductivity, high thermal conductivity, high battery storage capacity, electromagnetic radiation shielding, effective drug delivery and various medical properties, and useful catalysis properties.

$$CO_2 \rightarrow C_{nanomaterials} + O_2 \qquad \text{(EQN. 1)}$$

EQN. 1 demonstrates a molten electrolysis process whereby the carbon nanomaterials grow and remain on the cathode as a mix of tangled CNMs mixed with electrolyte. This mixture has been termed a carbanogel, and at least 95% of the electrolyte can be pressed out of this carbanogel by high-temperature press filtration.

Inclusion of sp² bonded carbon components of graphene and the single or multiple layered graphene, which can occur within a CNM component may provide the CNMs within a carbanogel enhanced properties such as, but not limited to, increased strength and conductivity of these CNMs. Additionally, the relative amount of a specific morphology of the CNM may impart additional properties into the carbanogel and products made therefrom. Examples of such morphologies include, but are not limited to: as spherical nanocarbon, solid and hollow nano-onions, nanocarbon of cylindrical allotropes, planar allotropes, helical allotropes, carbon nanotubes (CNTs), nanofibers, graphene, nano-platelets, nano-scaffolds, nano-trees, nano-belts, nano-flowers, nano-dragon, nano-trees, nano-rods, surface modified or metal coated CNMs, amorphous nanocarbon without graphitic characteristics or properties, or any combination thereof. Examples of such additional properties include, but are not limited to: reduced friction, resiliency, thermal conductance, flame resistance, chirality, enhanced surface area of the CNMs within the carbanogel or any combination thereof. These properties are useful for specific applications, including, but not limited to: lubrication, flexible materials, chiral light absorption, chiral light emission, chiral catalysis, improved electrochemical charge storage, enhanced catalytic activity, fire resistance, or enhanced EMF shielding capabilities. The CNMs within the carbanogel may also include additional features including doping, magnetism, unusual shapes and diminished or enlarged size. Without being limited by any theory, CNTs can include single walled CNTs; multi-walled CNTs; doped CNTs, such as boron, sulfur, phosphorous or nitrogen doped CNTs; magnetic CNTs; bamboo shaped CNTs; pearl shaped CNTs; isotope specific CNTs, such as $^{12}C$ and $^{13}C$ CNTs; surface modified or metal coated CNTs; helical CNTs, including single or double braided CNTs; spiral helical CNTs; thin, thick or solid walled CNTs; thin or thick diameter CNTs; short or wool (long) CNTs, or any combination thereof.

According to the embodiments of the present disclosure, a carbon-containing gas can be subjected to an electrolysis process, also referred to herein as the electrosynthesis process, for generating a carbanogel that contains a carbon nanomaterial (CNM) product from the carbon within the gas. The term "carbanogel" is used herein to refer to a mixture of CNM and electrolyte that is a product of the electrolysis process and is localized on the cathode during and after the electrolysis process. The terms "carbon nanomaterial product" and "CNM product" are used herein to refer to a collection of nanocarbon, which may also be referred to as nano-scaled carbon, of one or more morphologies. The term "nanocarbon" is used herein to refer to carbon that is arranged into specific structures, such as graphitic nanocarbon structures, within the nanoscale. In particular, the carbon from the carbon-containing gas can be split into carbon and oxygen using a molten electrolyte media and a variety of electrolysis process configurations. The electrolysis process can cause a mass transfer of carbon from a gas phase into the molten electrolyte media, the solid CNM product or both. The CNM product can be a substantially pure, pure, or impure, carbon nanomaterials (CNMs) including carbon nanotubes (CNTs). The CNM product may comprise one or more morphologies of CNM structures, as described herein above or any combination thereof. Optionally, one or more parameters of the electrolysis process may be adjusted in order to change the relative amount of a given morphology within the CNM product.

As shown in FIG. 1, the electrolysis process may occur within an apparatus 10 that comprises a case 12, which may also be referred to as an electrolysis chamber or electrolysis cell, for housing a cathode 18, where an anode 16 may form at least a portion of an inner surface of a wall of the case 12. Together the two electrodes define an electrolysis space therebetween. As will be appreciated by those skilled in the art, optionally the anode 16 may be separate from the wall of the case 12. The case 12 is configured to house an electrolyte media 21. The electrolysis space B, including an upper surface 21A of the electrolyte, may be in fluid communication with a source of the carbon-containing gas (shown as D in FIG. 1). In some embodiments of the present disclosure, the case 12 may be contained within an insulated housing 20 that is made of a thermal insulator material. The insulated housing 20 may also include a top 22, or sides or bottom (not shown) that is made of a thermal insulator material or not, and the thermal insulator may be from $CO_2$ permeable thermal insulator such as high temperature woven ceramics, or largely $CO_2$ impermeable thermal insulators. Examples of the permeable thermal insulator including, but are not limited to, Morgan Cerablanket®, made from oxides of alumina and silica and may include zirconia, and Morgan Superwool® made from alkaline earth silicates, both rated for temperatures in excess of 1,200° C. Examples of largely $CO_2$ impermeable thermal insulator include the wide range of available commercial firebricks or poured refractory cement and mortars, and examples of which include, but are not limited to: BNZ Materials firebricks and refractory cement and mortar such as PA 20 and 23, and BNZ 2000, 2300, 23A, 2600, 26-60, 2800, 3000 and 3200 rated for temperatures in excess of 1,090° C.

The source of the carbon-containing gas may be various industrial plants including but not limited to: cement manufacturing plants; iron refining plants; steel manufacturing plants; plants that make or use one or more of ammonia, ethanol, magnesium, hydrogen, polymers, plastics, glass; waste water treatment plants, food processing plants. The source of the carbon-containing gas may also be chemical reactors including internal combustion engines and combustion of carbonaceous materials for heating or cooking. Emission gases from a power generating plant, steam generation facility, or pyrolysis reactors may also be a source of the carbon-containing gas. A carbon-containing gas emitted from these sources or in the production of any high carbon-footprint substance may also contribute to or constitute a source of carbon for making a CNM product. In addition, a gas product of the combustion or transformation of fossil fuels for heating, transportation, and carbon products such as polymers and plastics can also contribute to or constitute a source of carbon for making a CNM product.

In some embodiments of the present disclosure, the anode 16 is formed as a planar structure, a wire structure, a screen, a porous structure, a conductive plate, a flat or folded shim, a coiled structure or the anode can form at least part of an inner side wall of the case 12. The anode 16 can be formed of various conductive materials so that the anode 16 may be oxygen generating or not. Such anode-forming materials include, but are not limited to: any conductive material that has a stable layer, or establishes, a highly stable oxide outer layer that is conducive to oxygen production during the electrolysis reactions performed according to the embodiments of the present disclosure, Ni, Ni alloys, galvanized (zinc coated) steel, titanium, graphite, iron, and a wide variety of metal which establish a highly stable oxide outer layer that is conducive to oxygen production. Further examples of suitable materials for forming the anode 16 include Nickel Alloy 36 (nickel without chromium, but with iron), Nichrome (nickel chromium-based alloys) including stainless steels such as SS 304 or SS 316, and inconel alloys, such as Inconel 600, 625, and 718, alloy C-264, or Nichromes such as Chromel A, B or, as the co-nucleation of the alloy components are known to produce high quality CNTs. Binary and ternary transition metal nucleation agents may also be useful that include, but are not limited to: Ni, Cr, Sn, In, Fe, and Mo can also affect CNM product growth.

In some embodiments of the present disclosure, a transition metal may be added on to the anode 16, which can be dissolved from the anode 16 to migrate through the electrolyte media 21 onto the cathode 18. The added transition metal can function as a nucleating agent, which may be selected from nickel, iron, cobalt, copper, titanium, chromium, manganese, zirconium, molybdenum, silver, cadmium, tin, ruthenium, zinc, antimony, vanadium tungsten, indium, gallium, or non-transition metals such as germanium or silicon, or a mixture thereof, including, but not limited to brass, Monel, and nickel alloys. The transition metal may also be introduced as a dissolved transition metal salt within the electrolyte media 21 directly to migrate onto the cathode 18. It is also possible to add the transition metal nucleating agent directly onto the cathode 18.

In some embodiments of the present disclosure, the cathode 18 is formed as a planar structure, a wire structure, a screen, a porous structure, a conductive plate, a flat or folded shim, a sheet, a coiled structure or the cathode can form at least part of an inner side wall of the case 12. The cathode 18 can be formed of various conductive materials that reflect the need for variation of the nucleation point and the CNM product that forms on the cathode 18. Such cathode-forming materials include, but are not limited to: any conductive material, galvanized (zinc coated) steel, titanium, graphite, iron, an alloy that comprises copper and zinc, Monel (Ni 400, a Ni/Cu alloy), Inconel, stainless steel, iron, Nichrome, pure Cu, and brass alloys may also be suitable as materials for making the cathode 18.

The anode 16 and the cathode 18 may be aligned substantially parallel to each other within the case 12, such as a stainless steel case or a case made of substantially pure or pure alumina. The case 12 may be made of any material that is suitable to contain the molten electrolyte media 21 and to sustain the temperatures achieved by the apparatus 10A. The electrodes may be oriented in any orientation, including but not limited to substantially horizontally or substantially vertically, but spaced apart from each other so as to define the electrolysis space B therebetween. In some embodiments of the present disclosure, the electrolysis space B is between about 0.1 cm and about 10 cm. In some embodiments of the present disclosure, the electrolysis space B is about 1 cm. As will be appreciated by those skilled in the art, the dimensions of the electrolysis space B will be dictated by the scale of the apparatus 10, such as the size of each electrode, the plenum defined within the case, the amount of electric current applied and combinations thereof.

The anode 16 and the cathode 18 are operatively connected to a source of electric current (not shown), which can be any source of an alternating current or a direct current, either constant or not, that provides a current density of between about 0.001 A/cm2 and 10 A/cm2. In some embodiments of the present disclosure, the current density provided between the electrodes is at least 0.02 A/cm$^2$, 0.05 A/cm$^2$, 0.1 A/cm$^2$, 0.2 A/cm$^2$, 0.3 A/cm$^2$, 0.4 A/cm$^2$, 0.5 A/cm$^2$, 0.6 A/cm$^2$, 0.7 A/cm$^2$, 0.8 A/cm$^2$, 0.9 A/cm$^2$, 1.0 A/cm$^2$ or greater. The power for the source of electric current may be any power source or combination of power sources, including electrical power sources, solar power sources and the like.

The source of heat (not shown) can be any source of heat that increases the temperature within the case 12 to a temperature that causes the electrolyte media 21 to transition to a molten phase. For example, the source of heat can achieve a temperature within the case 12 of between about 500° C. and about 850° C. or higher. In some embodiments of the present disclosure, the heating achieves a temperature between about 700° C. and about 800° C., between about 720° C. and about 790° C., or between about 750° C. and about 780° C. In some embodiments of the present disclosure, the heating achieves a temperature of 749-750° C., 751-752° C., 753-754° C., 755-756° C., 757-758° C., 759-760° C., 761-762° C., 763-764° C., 765-766° C., 767-768° C., 769-770° C., 771-772° C., 773-774° C., 775-776° C., 777-778° C., or 779-780° C. In some embodiments of the present disclosure, the temperature within the case 12 can be increased to about 800° C. or hotter. In some embodiments of the present disclosure, the source of heat is provided by, or is supplemented by, the exothermic reaction of $CO_2$ absorption and conversion to carbonate (mass transfer from the gas phase to the solid phase CNM product), or an over potential of applied electrolysis current.

In some embodiments of the present disclosure, the electrolyte media may comprise a carbonate that can be heated by the heat source until it transitions to a molten phase. For example, the carbonate may be a lithium carbonate or lithiated carbonate. Molten carbonates, such as a lithium carbonate ($Li_2CO_3$), which has a melting point of 723° C., or lower melting point carbonates such as $LiBaCaCO_3$, having a melting point of 620° C., when containing oxide includes spontaneous oxide formation that occurs upon melting, or that is a result of electrolysis or when mixed with highly soluble oxides, such as $Li_2O$, $Na_2O$ and BaO, sustain rapid absorption of $CO_2$ from the space above the molten electrolyte media. Suitable carbonates may include alkali carbonates and alkali earth carbonates. Alkali carbonates may include lithium, sodium, potassium, rubidium, cesium, or francium carbonates, or mixtures thereof. Alkali earth carbonates may include beryllium, magnesium, calcium, strontium, barium, or radium carbonates, or mixtures thereof. In some embodiments of the present disclosure, the electrolyte can be a mixed composition for example, a mix of alkali carbonates and alkali earth carbonates and one or more of an oxide, a borate, a sulfate, a nitrate, a chloride, a chlorate or a phosphate.

According to the embodiments of the present disclosure, the carbanogels are formed by the molten carbonate electrolytic splitting of $CO_2$. The carbanogels comprise a mixture of a CNM network and electrolyte that remain after the electrolysis process is stopped. Interestingly, not only can the carbanogel retain the CNM network after crushing, but the crushed pieces can be reassembled to form a buckypaper. Some, most, substantially all or all of the electrolyte can removed from the buckypaper by pressing, reacting or washing the electrolyte out. Pressing the crushed pieces, with or without the electrolyte, can result in a contiguous layer that may be referred to as "carbanogel buckypaper" (CB). After removing some or all of the electrolyte, the carbanogel consists of CNMs composed of high purity carbon. After removing some or all of the electrolyte, the CB may define internal voids. For example, the CB may define void spaces within the CB, upon the CNM surfaces within the CB, within the CNM (internal of the CNM) or combinations thereof. For the purposes of this disclosure, the term "void" means a two or three-dimensional space within the CB that is substantially free of electrolyte or other matter.

In some embodiments of the present disclosure, the voids defined within the CB may be partially, substantially fully filled or completely filled with a void-filling agent, such as an application-based material. Examples of suitable void-filling agents include, but are not limited to: a strengthener, a catalyst, a dopant, a medicine or an electromagnetic field (EMF) shielding agents. Strengtheners can include, but are not limited to epoxies, resins and other polymers, cementitious materials and metals. Catalysts can include, but are not limited to materials to expedite chemical or electrochemical reactions. Dopants can include, but are not limited to materials that at low quantity within the voids materially affect the physical chemical properties of the CB. The CNM components in the CB can be aligned mechanically, electrically or magnetically during the CB formation to further enhance the CB properties, including, but not limited to strength, electrical, and thermal properties. The electrical and/or magnetic alignment is achieved with application of an orienting electrical and/or magnetic field during the CB preparation stages. Magnetic CNMs are prepared by incorporating magnetic materials, such as metals or metal carbides during the electrolysis process when generating the CNM. The CB sheets may be used alone, such as in liners, heat retardants, or shields, or in combination, such as but not limited to laminates, with other materials to impart improved properties to those other materials.

It is known that the high production cost of CNMs is predominantly due to high reactant and energy costs. Without being bound by any particular theory, these production costs can be lowered by two orders of magnitude when produced from $CO_2$ using a molten electrolysis process according to the embodiments of the present disclosure.

Some embodiments of the present disclosure relate to a system 200 for making a CB product 222. As shown in the non-limiting example of FIG. 2, the system 200 comprises an apparatus 210 for performing an electrolysis process that splits carbon dioxide ($CO_2$) within a molten electrolyte for producing a carbanogel, a mold 212 and a compression unit 214. The system 200 may be used to perform the methods of the present disclosure, as described herein below.

In some embodiments of the present disclosure, the apparatus 210 may be the same or similar to the apparatus 10 described herein above. The apparatus 210 is configured to perform an electrolysis process that splits a carbon-containing gas within a molten electrolyte. The product of that splitting is a CNM product with bulk or residual electrolyte there within, namely a carbanogel that may also be referred to as a carbanogel product.

The mold 212 is a vessel that receives the carbanogel (as shown by line X in FIG. 2), whether as a cool product or hot product. The mold 212 can be made of various materials and be of any shape and dimension, provided that the mold 212 is robust enough to withstand the temperatures and pressures that may be applied to the carbanogel there within. The CB product 222 is received from the mold 212 and, optionally, the system 200 may further include an isolation unit 224 for protecting the CB product 222 from an oxidative environment. The isolation unit 224 may include a fluid tight vessel that is of suitable dimensions to receive the CB product 222 and to remove any oxidative agents, such as oxygen containing gas, from within the vessel, for example by vacuum pump, and to replace and fluids within the vessel with a non-oxygen containing gas, such as an inert gas.

The compression unit 214 can be various suitable components, mechanisms or machines that apply a compressive force upon the carbanogel within the mold 212. The amplitude of the compressive force can vary depending on the size of the carbanogel particles received in the mold 212 and the extent to which the carbanogel comprises electrolyte, as discussed further below. In some embodiments of the present disclosure, the compression mechanism 214 includes a vacuum that can pull the carbanogel (as shown by line Y in FIG. 2) through a filter, either within or into the mold 212.

In some embodiments of the present disclosure, the system 200 may further include a processing unit 216 for crushing a cooled or hot carbanogel product prior to (or following) being received by the mold 212. The processing unit 216 can be various suitable components, mechanisms or machines that can withstand the temperatures of the carbanogel, such as but not limited to: a grinder; a mincing unit; a physical press; a pulverizing unit; a mill or any combinations thereof. The resulting particle size of the carbanogel is determined by the extent of the processing operation performed by the processing unit 216.

In some embodiments of the present disclosure, the system 200 may further comprise an electrolyte reducing unit 218. The electrolyte reducing unit 218 can receive the carbanogel product, cooled or hot, directly from the apparatus 210 and/or it may receive the processed carbanogel product from the processing unit 216. The electrolyte reducing unit 218 reduces the electrolyte content of the carbanogel product (processed or unprocessed) so that the reduced electrolyte content carbanogel can be processed (or further processed) in the processing unit 216 and then received in the mold 212. Alternatively or additionally, the reduced electrolyte content carbanogel can be received in the mold from the electrolyte reducing unit 218.

The electrolyte reducing unit 218 can reduce the electrolyte content of the carbanogel (processed or unprocessed) by mechanical approaches, chemical approaches, electrochemical approaches or any combination thereof. For example, the mechanical approaches may include various suitable components, mechanisms or machines that can reduce the electrolyte content of the carbanogel, such as a mechanical press that pushes the carbanogel through a mesh, or a sieve, a heater for melting the electrolyte within the carbanogel, a filter (room temperature or high temperature) or any combination thereof. The chemical approaches for reducing the electrolyte content of the carbanogel include one or more washing stations for exposing the carbanogel to one or more chemicals that can dissolve the electrolyte. In addition to reducing the electrolyte content the one or more chemicals may also be applied to dissolve impurities, such as amorphous carbons or metals, from the CNM within the carbanogel. The electrochemical approaches include apparatus for performing selective electrolysis for reducing the electrolyte content and/or impurity content of the carbanogel.

Figure 2:
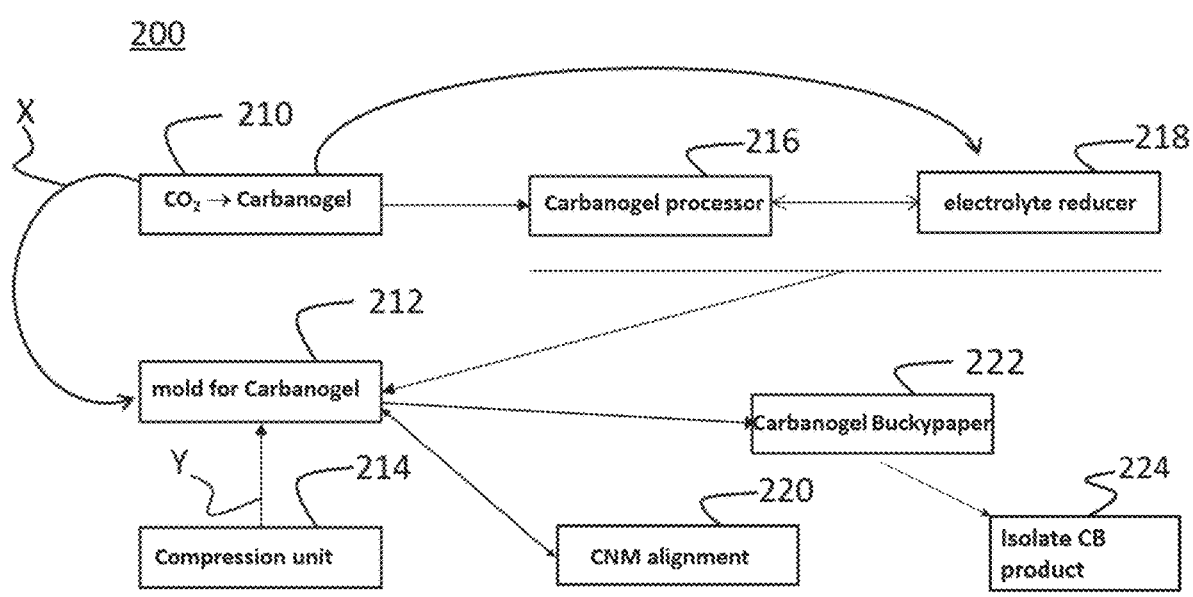
FIG. 2 is a schematic of a system, according to the embodiments of the present disclosure, for making a carbanogel buckypaper product.

In some embodiments of the present disclosure, the system 200 may further include an alignment unit 220 that aligns at least a portion of the CNM components in the carbanogel (processed and/or electrolyte reduced or not) and/or the CB product (as shown in the non-limiting example of FIG. 2). The alignment unit 220 may be integrated into the mold 212 such that the alignment procedure performed by the alignment unit 220 occurs within the mold. Alternatively or additionally, the alignment unit 220 may be a separate physical component from the mold 212 that can receive uncompressed carbanogel (processed and/or electrolyte reduced or not), perform the alignment procedure and then transfer the aligned carbanogel to the mold 212. The alignment unit 220 may employ one or more of a mechanical approach, an electric approach, a magnetic approach or any combination thereof so that the aligned CMN components within a CB product have desired anisotropic properties. The alignment unit 220 may employ a mechanical approach by various suitable components, mechanisms or machines can apply an orienting physical stress field to the CNMs within the carbanogel (processed and/or electrolyte reduced or not) and/or within the CB product. For example, the mechanical approach can apply a shear force to the CNM product within the carbanogel. The shear force can be applied by pulling, spinning or dragging a body, such as a piston, through the CNMs within the carbanogel (processed and/or electrolyte reduced or not) and/or within the CB product. Alternatively, the shear force can be directionally applied to increase CNM entanglement rather than CNM alignment.

The alignment unit 220 may employ an electrical approach by various suitable components, mechanisms or machines that can apply an orienting electrical field to the CNMs within the carbanogel (processed and/or electrolyte reduced or not) and/or within the CB product.

The alignment unit 220 may employ magnetic approach by various suitable components, mechanisms or machines that can apply an orienting magnetic field to the CNMs within the carbanogel (processed and/or electrolyte reduced or not) and/or within the CB product.

In some embodiments of the present disclosure, the alignment unit 220 may be used to decrease rather than increase the directional alignment of the CNM and, therefore, a decrease in any anisotropic properties of the CB product.

Figure 3:
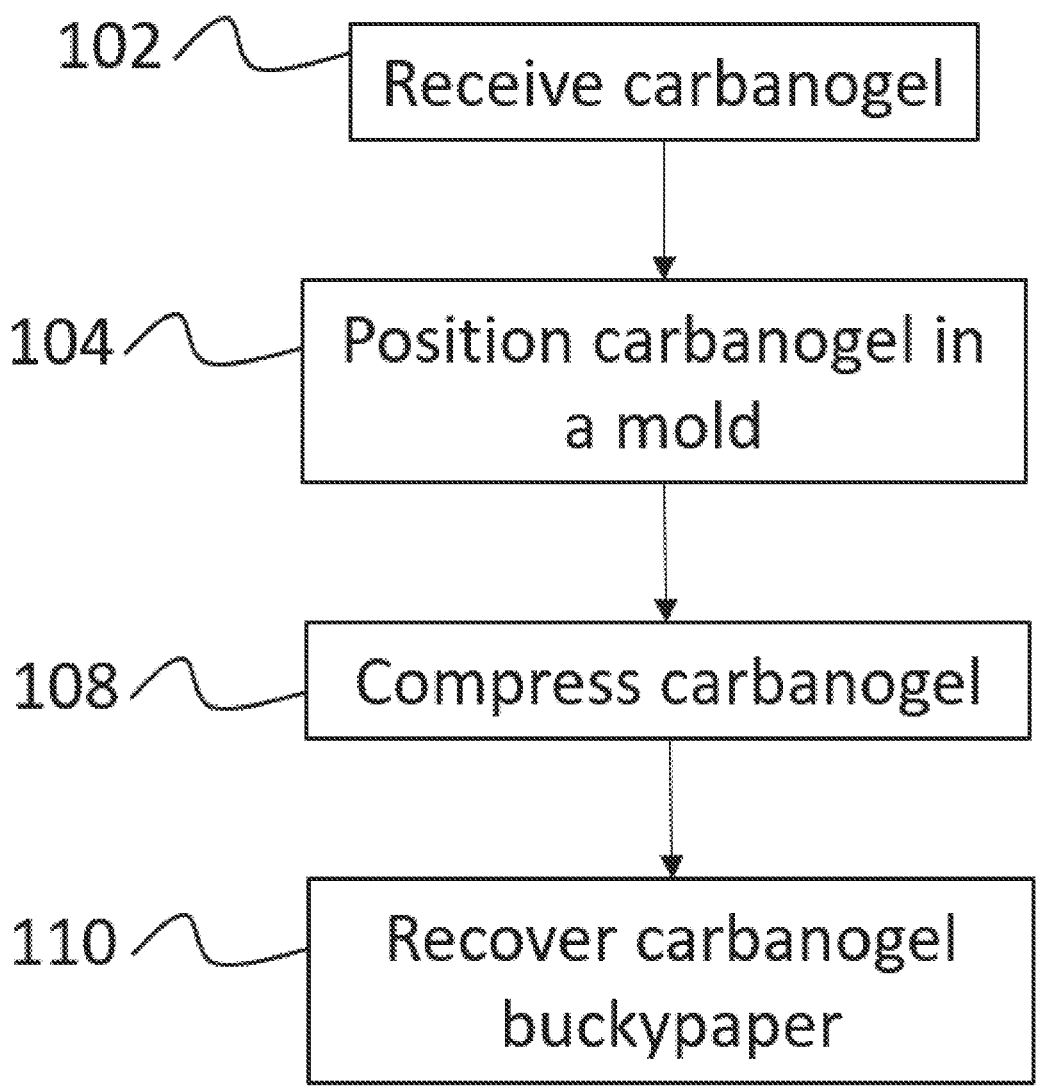
FIG. 3 is a schematic that represents steps of a method according to embodiments of the present disclosure.
Figure 4:
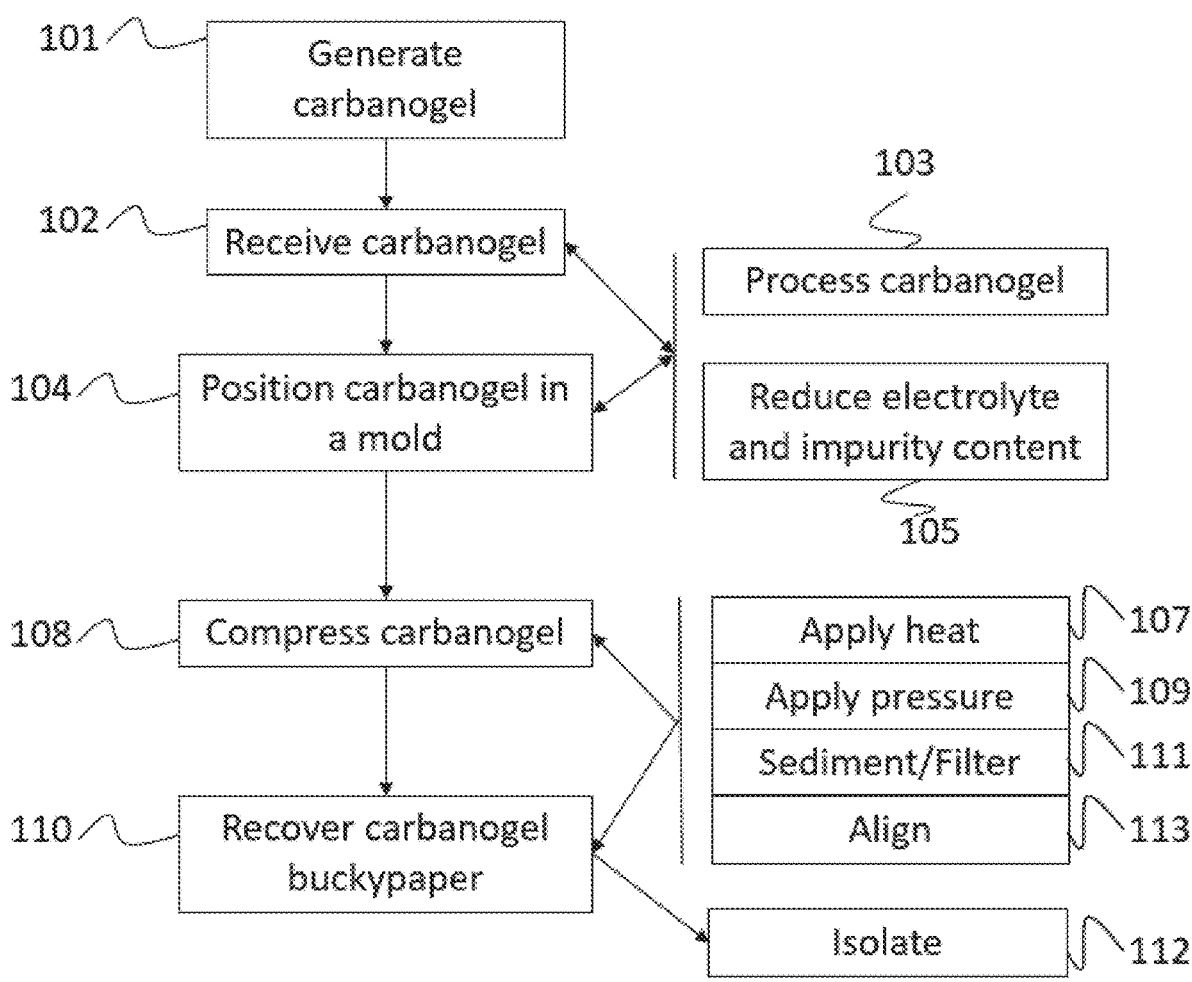
FIG. 4 is a schematic that represents steps of a further method according to embodiments of the present disclosure.

FIG. 3 shows the steps of a method 100 for making a CB product as comprising the steps of receiving 102 a carbanogel, positioning 104 the carbanogel in a mold, compressing 108 the carbanogel and recovering 110 the CB product. FIG. 4 shows a method 100A that includes many of the steps of method 100 and the further step of generating 101 the carbanogel by the electrolysis process described herein above and the steps of processing 103 and/or reducing 105 the electrolyte content of the carbanogel.

For the step of receiving 102, the carbanogel may be generated using the electrolysis process described herein above, this may be referred to as the step of generating 101. The generated carbanogel contains the tangled product of the CNM grown on the cathode during the molten electrolytic splitting of $CO_2$. By selectively controlling the operational parameters of the generating step 101, electrolysis process described above, the generated carbanogel can have a greater relative amount of a desired morphology of the CNM within the carbanogel. For example, the electrolysis process can be controlled to increase the relative amounts of spherical nanocarbon, solid and hollow nano-onions, nanocarbon of cylindrical allotropes, planar allotropes, helical allotropes, carbon nanotubes (CNTs), nanofibers, graphene, nano-platelets, nano-scaffolds, nano-trees, nano-belts, nano-flowers, nano-dragon, nano-trees, nano-rods, surface modified or metal coated CNMs, amorphous nanocarbon without graphitic characteristics or properties, or any combination thereof as compared to other morphologies of nanocarbon structures within the CNM of the carbanogel.

The generated carbanogel that contains the CNM product may be received in a step of carbanogel processing 103 that includes allowing the carbanogel to cool, peeling, or breaking off pieces of the carbanogel from the cooled cathode 18, crushing the carbanogel, or any combination thereof. Alternatively, in the step of processing 103, the carbanogel that contains the CNM product can be extracted while still hot from the cathode 18 and containing hot molten electrolyte and then subjecting the hot carbanogel to crushing or other steps of the methods described herein. As such, the step of receiving 102 may be of cooled and solid or hot and thick, fluid carbanogel, which may have been subjected to further processing, or not.

According to the embodiments of the present disclosure, the step of processing 103 can be performed by various approaches such as crushing techniques including, but not limited to: grinding; mincing; pressing; pulverizing; milling or combinations thereof. The resulting particle size of the carbanogel material within the carbanogel is determined by the extent of the crushing. Furthermore, the resulting carbanogel particle size may constrain the minimum thickness of the CB product. Further and/or more rigorous crushing will result in a smaller carbanogel particle size and, hence, a thinner CB product as compared to the scenario where the step of processing 103 is performed for a shorter amount of time and/or with less rigor.

In some embodiments of the present disclosure, the electrolyte and impurity content of the carbanogels can be reduced by the step of reducing 105. Without being limited, the reduced impurities may include non-graphitic carbons, such as amorphous carbon and metals, or a combination thereof. Some, most, substantially all or all of the electrolyte and or the impurities can be removed from the carbanogel by pressing, reacting or washing the carbanogel with chemical, mechanical or electrochemical approaches. For example, mechanical approaches for the reducing step 105 may include applying physical pressure to the carbanogel to mechanically force electrolyte out of the carbanogel through a sorting device such as a mesh with specific pore sizes. Mechanical approaches may also include regulating temperatures above the melting point of the electrolyte to facilitate electrolyte flow and separation. The melting point of alkali and alkali earth carbonate electrolytes range from less than 400° C. for molten eutectic ternary Li, Na, K carbonate to 891° C. for potassium carbonate. The applied pressure can range from 0 up to 1000 pounds per square inch (psi), 1000 up to 2000 psi, or 2000 or greater psi. Alternatively or additionally, the reducing 105 may include a chemical approach whereby the carbanogel is exposed to one or more chemicals to cause a reaction whereby the electrolyte content of the carbanogel is reduced. For example, a washing liquid can be used to wash the carbanogel, where the washing liquid can dissolve a portion of the residual, or bulk, electrolyte from the carbanogel particles. The washing liquid can include neutral pH liquids such as water or aqueous salt solutions, or acidic or alkaline solutions which can promote dissolution of the molten electrolyte, such as formic or hydrochloric acid, or ammonia sulfate, oxidizing solutions, such as permanganate or peroxide, or organic solvents, or any combination thereof. In addition to reducing the electrolyte the washing liquid can be applied to dissolve impurities, such as amorphous carbons or metals, from the CNM. In some embodiments of the present disclosure, electrolyte content of the carbanogel can be reduced by room temperature filtration and/or high temperature filtration. Further approaches for reducing 105 the electrolyte content of the carbanogel include, but are not limited to: mechanical approaches like sieving and filtering; electrochemical means, such as selective electrolysis; thermal means, such as oxidative removal by combustion of less stable amorphous carbons can also be applied to remove CNM impurities; or any combination thereof. Reducing the electrolyte content of the carbanogel may increase the relative proportion of CNMs in the carbanogel, which can lower the pressure required to form the CB product. In some embodiments of the present disclosure, the step of reducing 105 the electrolyte and/or impurity content of the carbanogel can be performed one or more times on the processed or unprocessed carbanogel.

During the positioning step 104, the carbanogel can be positioned in a mold, such as mold 212, and then the processing step 103 and/or the reducing step 105 can occur. Alternatively, the processing step 103 and/or the reducing step 105 can occur in a vessel, other than the mold and then the processed and/or electrolyte and/or impurity reduced carbanogel can be positioned in the mold. Accordingly, in FIG. 4 a double-headed arrow is used to represent the interchangeability of the order of the positioning step 104 and the processing step 103 and the reducing step 105. The shape of the mold will determine the final shape of the CB product, which is not limited in any way. In some embodiments of the present disclosure, the mold may be substantially flat with a top and a bottom for producing a substantially planar sheet of CB product. In other embodiments of the present disclosure, the mold may have a desired three-dimensional (3D) shape so that the CB product will have a similar 3D shape. The 3D mold can be of substantially any shape.

Surprisingly, under compressive pressure the carbanogel particles may assemble to form a contiguous sheet. Several layers of thin crushed carbanogel particles, or one or more layers of larger carbanogel particles can be subjected to the step of compressing 108 to make the CB product. For example, following the compressing 108 one layer of crushed carbanogel particles sized about 25 μm will form a sheet that is approximately, but less than, 25 μm thick. Whereas, four layers of 25 μm sized carbanogel particles will form a sheet that is approximately, but less than, 100 μm thick. Similarly, 1 layer of 100 μm sized carbanogel particles will form a sheet that is approximately, but less than, 100 μm thick.

The step of compressing 108 the carbanogel and the steps of applying heat 107, applying pressure 109, allowing sedimentation to occur and/or filtering 111, such as vacuum filtering, and a step of aligning 113 or any combination thereof, to the carbanogel may be repeated more than one time to ensure formation of the desired CB product. Under various conditions, the step of applying pressure 109 may include applying a pressure of between about 1 to about 1,000 psi, between about 1,000 to about 2,000 psi, or above 2,000 psi can be applied to the carbanogel particles to form the CB product. Applying pressure 109 in the higher end of these ranges, or beyond, may be required to form sheets of CB product that are stable at room temperature. Those stable sheets of CB product may then be subjected to a further step of heating 107, optionally in the mold, to temperatures sufficient to melt any residual electrolyte within and among the carbanogel particles. The temperature required to melt any residual electrolyte will depend on the electrolyte composition. In general, the carbanogel particles will tend to decompose where at least a portion of the CNM content of the carbanogel converts to carbon monoxide (CO) at temperatures above 900° C. Although some CNM structures may be sustained within the carbanogel at temperatures of about 1000° C. in the presence of high $CO_2$ gas pressure. For example, a pure $Li_2CO_3$, $Na_2CO_3$, or $K_2CO_3$, electrolytes have a melting point of about 723° C. 851° C., and 891° C. respectively, while a mix of $Li_2CO_3$ and $Na_2CO_3$ can melt at temperature less than about 700° C., and a $Li_xNa_yK_zCO_3$ eutectic melts at 399° C. As such, the step of heating 107 can occur within a temperature range of about 0° C. and about 1000° C., in the presence of high pressure $CO_2$ or a narrower range of about 15° C. and about 900° C. or between about 399° C. and about 850° C.

When the CB product has had most, substantially all or all of the electrolyte content removed the CB product loses a protection provided by the electrolyte. As such, care may be required to prevent oxidative loss of the CNM product, such as, but not limited to, an optional step of isolating 112 the CB product from an oxygen-containing atmosphere or adding an oxygen-free protecting gas, such as an inert gas that will not oxidize or otherwise react with the CB product. Non-limiting examples of such an inert gas include nitrogen, argon or a mixture of gases with a full complement of valence electrons.

Without being bound by any particular theory, the steps of method 100 and method 100A may cause fused residual electrolyte or bulk electrolyte (depending on whether the reducing step 105 is performed and to what extent) to be combined with van de Waals between the CNM structures to provide a driving force for assembling the carbanogel particles into a contiguous sheet of CB.

As described above, the CB product may define voids that can be left vacant. Alternatively, these voids can be partially, substantially fully or fully filled with application-based materials, such as strengtheners, catalysts, dopants, magnetic materials, medicines or EMF shielding enhancing agents. Similarly, during the generating step 101 using the electrolysis process for making the CNM product, the CNMs themselves can be modified with strengtheners, catalysts, dopants, magnetic materials, medicines or EMF shielding enhancing agents.

Strengtheners that may be included in the void spaces of the CB product can include, but are not limited to epoxies, resins and other polymers, cementitious materials, metals and alloys. Catalysts that may be included in the void spaces include, but are not limited to materials to expedite chemical or electrochemical reactions. Dopants that may be included in the void spaces can include, but are not limited to: boron, nitrogen, sulfur, phosphorous and cobalt, aluminum, silicon, copper, silver, zinc, cerium, platinum, gold, ruthenium, osmium, tellurium, their respective oxides, salts combinations thereof and other materials that incorporated within the structure of the CNMs and which at low relative quantities materially affect the physical and chemical properties of the CNMs and the carbanogel buckypaper made therefrom. When incorporated the dopants may enhance properties including, but not limited to, conductivity, catalytic activity and battery storage capacity. Magnetic materials that may be included in the void spaces of the CB product include, but are not limited to: one or more of iron, nickel, cobalt, gadolinium, samarium, neodymium, steel, or their carbides, and other alloys comprising one or more magnetic materials with ferromagnetic properties, paramagnetic properties, diamagnetic properties and any combination thereof. Magnetic properties of the enhanced CB product include applications for flexible magnets, magnetic storage and magnetic shielding.

The known processes for manufacturing buckypaper products require a dispersion step, such as sonication, in order to provide a homogeneous distribution of the CNM components within the buckypaper product. In contrast, according to the embodiments of the present disclosure, and without being bound by any particular theory, the CNMs within the carbanogel and/or the CB product may already homogeneously distributed. Hence, the embodiments of the present disclosure do not require such a CNM dispersion step; however, this step may be added to mix in other additives, or quality control. In the embodiments of the present disclosure, steps to apply forces that align the CNMs, rather than disperse, may additionally be utilized in the embodiments of the present disclosure. Additionally, liquids may added prior to the step of applying 108 to maintain more even layering of the carbanogel particles. These steps of aligning 113 may impart directional, anisotropic properties into the CB product, and the steps of aligning 113 may also provide enhanced properties to the CB product. For example, imparted directional, anisotropic properties may provide, but are not limited to, enhanced strength, conductivity and directional interactions with visible and other electromagnetic radiation as compared to other buckypaper products and CB products of the present disclosure that are not subjected to an aligning step 113. The step of aligning 113 can include applying one or more alignment forces such as linear, radial, cylindrical, spherical forces or forces of other geometries to produce linear, radial, cylindrical, spherical or other directional geometries of anisotropy within the carbanogel.

The step of aligning 113 can be applied to the CNM components in the carbanogel and/or the CB product mechanically, electrically, magnetically or any combination thereof during the methods 100, 100A. The step of aligning 113 by mechanical alignment can be achieved by applying a shear force, such as by pulling or spinning during one or more of the process steps or dragging a piston for applying a formation pressure upon the CNMs within the carbanogel and/or within the CB product. Alternatively, the shear force can be directionally applied to increase CNM entanglement rather than CNM alignment.

The step of aligning 113 by electrical alignment may be achieved by applying an orienting electrical field to the CNMs within the carbanogel and/or within the CB product during the methods 100, 100A. The step of aligning 113 by magnet alignment may be achieved by applying an orienting magnetic field during the methods 100, 100A. Operational parameters of the step of generating 101 may be selected so that the electrolysis process creates magnetic CNMs. For example, the operational parameters may be selected to add metals or metal carbides during the electrolysis process. Without being bound by any particular theory, a decrease in distance of the magnetic field, more than for the electric field, during magnetic alignment may be more offset than during the electric alignment due to the competing random disorder of Brownian motion, which increases with temperature and freedom of motion, and decreases with increasing molecular mass and viscosity. Hence, the step of aligning 113 may be enhanced by decreases of temperature and increases with viscosity of the carbanogel.

Figure 5:
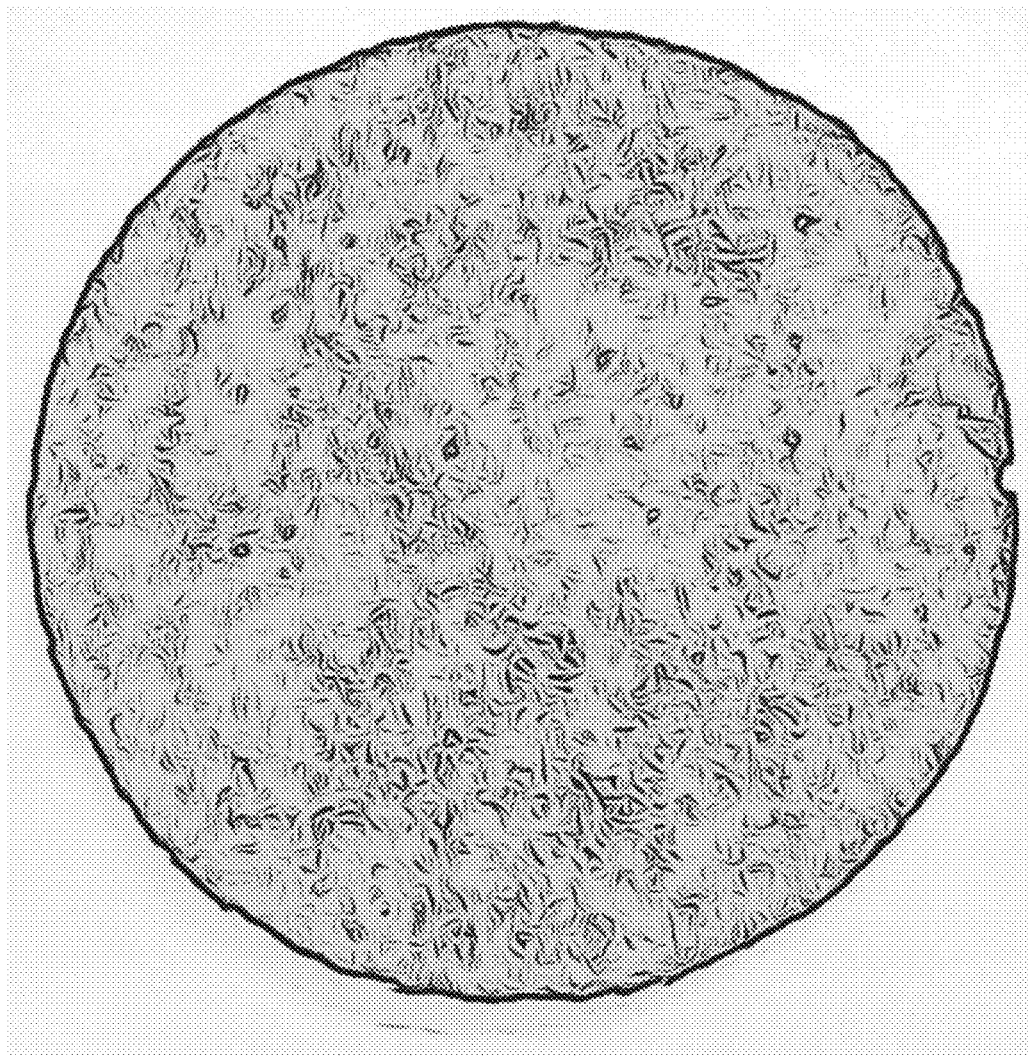
FIG. 5 is a photograph of a carbanogel buckypaper made according to embodiments of the present disclosure.

FIG. 5 is a first example of a CB made from $CO_2$. The example is entirely black; the figure was lightened to highlight contrast. The first CB example was made using an electrolysis to transform $CO_2$ to carbanogel. The carbanogel is made in the apparatus 10 using a steel stainless case 304 in a 750° C. $Li_2CO_3$ molten electrolyte with a Muntz brass cathode and a stainless steel 304 anode producing a CNT carbanogel product. The carbanogel was also a made from $CO_2$ CNT product when the cathode was changed to Monel or Ni alloys, including Inconels, Nichromes and Ni-iron and Ni-copper alloys, and the anode was changed to Inconels, Nichromes and Ni-iron and Ni-copper alloys. 0.2 grams of this carbanogel product was cleaned with hydrochloric acid (HCl) and mixed in 300 mL of Isopropyl alcohol, and then sonicated for 30 minutes for an even dispersion. The mixture was then poured into a vacuum filter assembly (Nylon Membrane Filters; 0.2 μm Pore, 47 mm diameter), and the liquid was pulled out under vacuum, a wide range of filter pore sizes and solvents are found to be effective to form buckypaper from $CO_2$ transformed to carbanogel in this manner. The CNTs had mixed orientations in the forming CB, or were aligned when a mechanical force, electrical field or magnetic field was applied during the liquid (alcohol) removal stage. Once all noticeable alcohol was passed through the filter, the filter was taken out and dried overnight at room temperature. The resultant CB was removed off the Nylon Membrane Filter and had a thickness of 180 μm.

Figure 6:
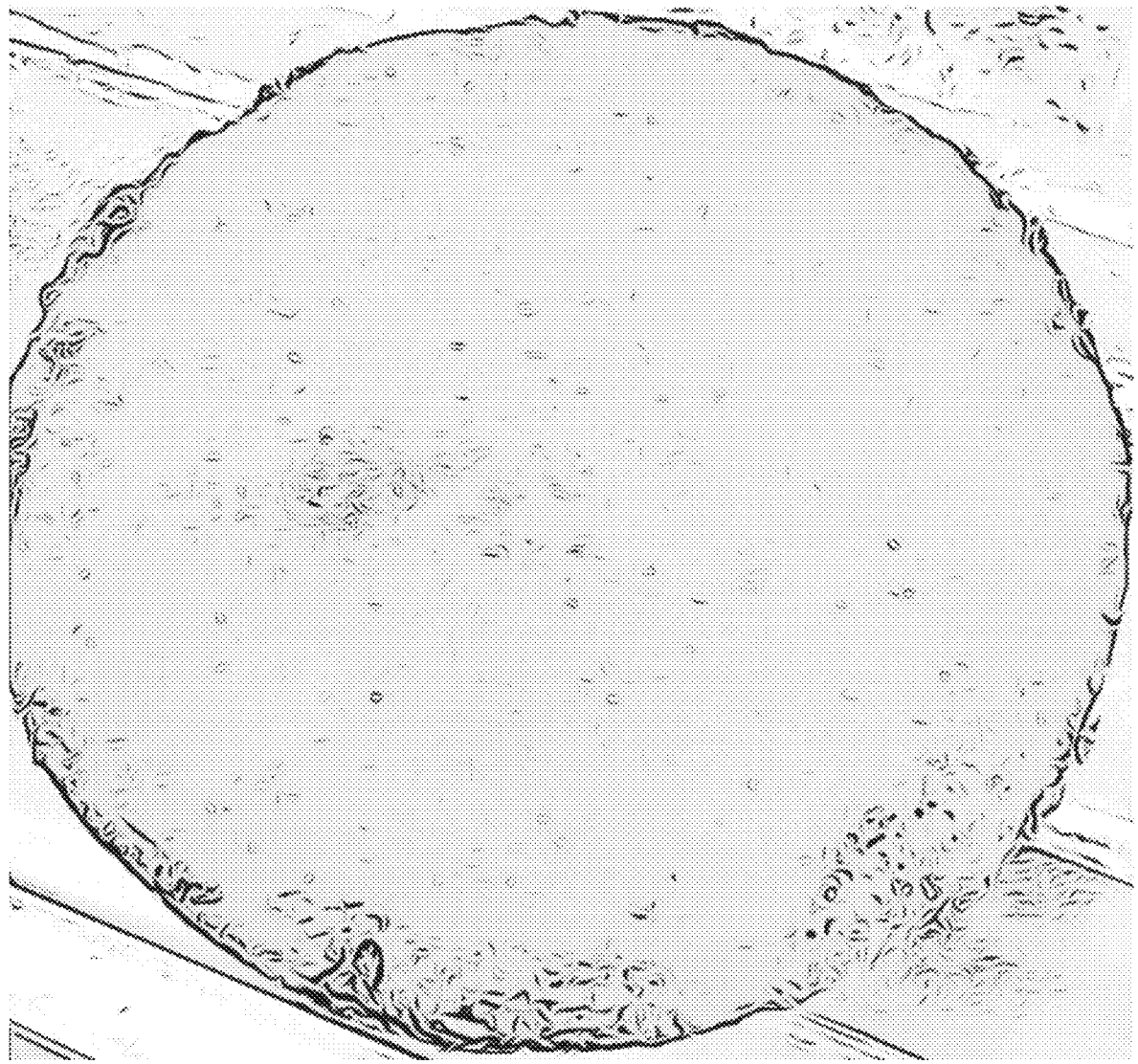
FIG. 6 is a photograph of a further carbanogel buckypaper made according to embodiments of the present disclosure.

FIG. 6 is a second example of a CB made from $CO_2$. The example is entirely black in color; the figure was lightened to highlight contrast. The FIG. 6 CB example was made from $CO_2$ transformed to carbanogel as described in the previous example, but instead of chemical washing, the electrolyte content of the carbanogel was reduced by compression. Specifically, the carbanogel was generated at the cathode and was then compressed through a mesh or layers of mesh while hot and containing both solid CNM and the molten electrolyte. A 500 psi pressure at 750° C. was used to produce the CB in FIG. 6 Similar, but thinner, CBs were produced at an applied pressure of 1000 psi and higher, while thicker CB was produced with less than 500 psi of applied pressure. The CB shown in FIG. 6 has a diameter of about 350 mm, and approximately 2 fold larger have been also made with 500 psi of applied pressure. The carbanogel has also been directly compressed on the hot cathode (after removal from the case), or as in this example, compressed subsequent to transfer from the cathode. The carbanogel can be transferred while hot, or as in this example, transferred subsequent to processing (such as cooling, peeling, crushing and reheating to remelt electrolyte within the carbanogel) subsequent to transfer from the cathode. The screen mesh sizes used in the compression are measured in units of lines per inch vary from a mesh size of 2 to 100, or a mesh size of 100 to 1,000 or a mesh size above 1.00 lines per inch to reduce the electrolyte from the product. Mesh sizes around 60 with a pore size of approximately 250 μm are particularly effective along with various larger sizes. Note, that the 250 μm pore size is much larger than the nanomaterial dimensions of the CNMs within the CB. Without being bound by any theory, the $CO_2$ transformed buckypaper is formed during compression as the larger size of the intermingled CNM in the carbanogel is retained by the mesh, while the electrolyte passes through the mesh. The resultant CB has a thickness linear proportionally to the starting mass of the carbanogel and approximately inversely proportionally to the applied pressure.

Figure 7:
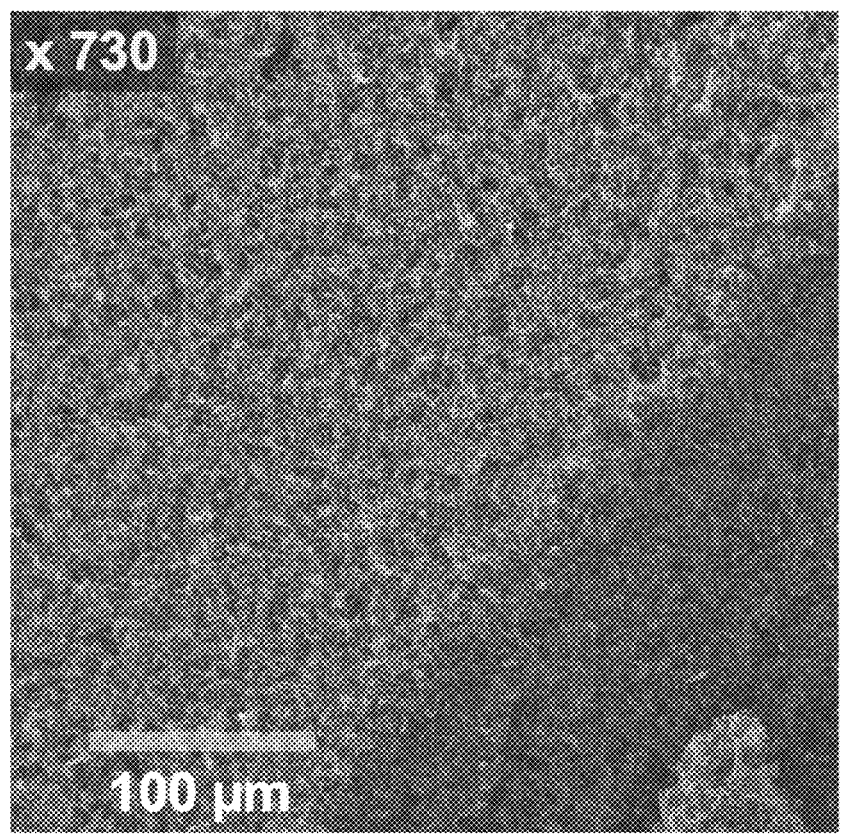
Figure 7:
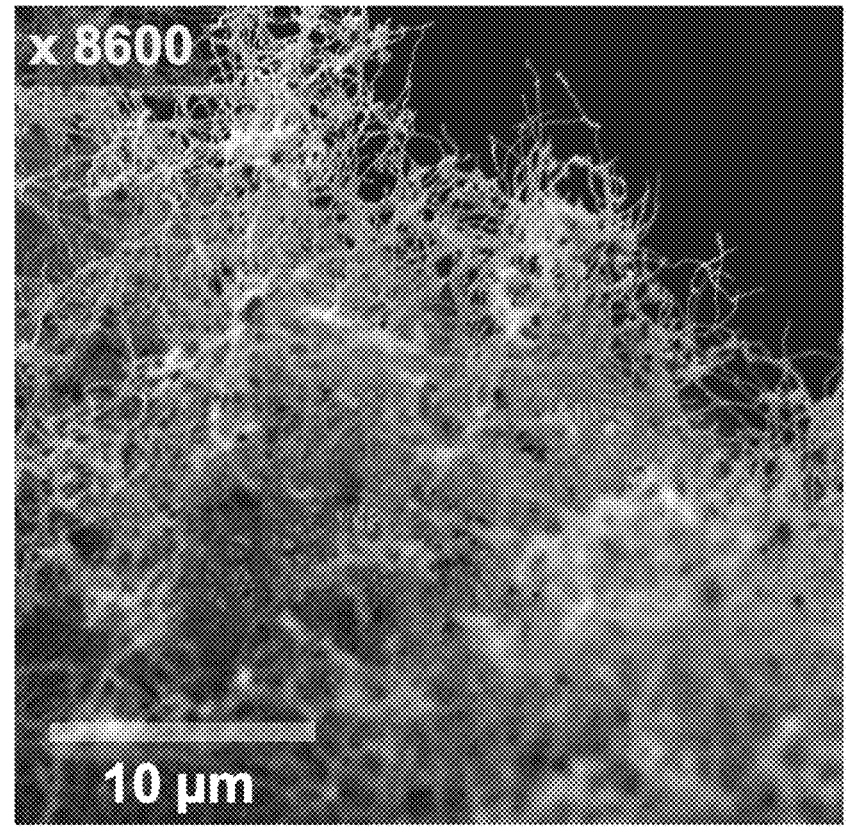

FIG. 7 is an example of carbanogel with electrolyte reduced by washing, and is shown at two different magnifications of ×720 and ×8600 as measured by scanning electron microscopy, SEM. This example is of a CNT carbanogel as prepared by $CO_2$ electrolysis in the previous examples. The large particle size of the intermingled CNMs comprising the carbanogel is evident in the half of FIG. 7. This is large the 0.2 Mm pore size in the first example or the 250 μm size mesh size in the second example. This allows the carbanogel to be readily formed from microscopic restraining filters despite the nanomaterial dimensions of the carbanogel materials in the lower portion of FIG. 7. Subsequent to the electrolysis, the carbanogel was peeled from the cooled cathode, and broken up. The carbanogel, broken into pieces, is shown in the SEM image of FIG. 7 subsequent to washing with concentrated HCl, and the high purity of the CNTs and their orientation in a diverse range of directions is evident. An alternate wash with dilute HCl acid similarly washes out electrolyte and metal impurities as measured by electron dispersive spectroscopy, EDS, and thermal gravimetric analysis, TGA. An alternative wash with either water or formic acid mainly removes the excess electrolyte, and not the metal impurities. An alternative wash with either water or formic acid or ammonium sulfate mainly removes the excess electrolyte, and not the metal impurities. Another alternative wash combining hydrochloric acid and hydrogen peroxide, in this case, sonicating, rather than mixing the carbanogel in a solution of concentrated HCl and 35% H2O2, removes excess electrolyte, metal impurities, and in addition amorphous carbon impurities. Similarly, other chemical oxidizers, such as hydrochloric acid and potassium permanganate, are observed to be effective with adequate dilution, and electrochemically generated oxidizers have been generated. As measured by a lower combustion temperature with TGA of amorphous carbon compared to carbon nanotubes, amorphous carbon is more prone to oxidation than the more robust layered graphene CNT structure, and may be removed as an impurity by chemical, electrochemical or thermal oxidation. As a further example of reducing the impurity content of carbanogel, the carbanogel subsequent to HCl wash is heated to 300° C., which as measured by mass loss, and by TGA largely removes the amorphous carbon impurity, and as measured by SEM, retains the CNTs comprising the carbanogel.

The CB product made according to the embodiments of the present disclosure may be used various applications such as, but not limited to: in liners, heat retardants, or shields. However, the CB product of the present disclosure may also be used as a component in a composite material such as, but not limited to, a laminate that incorporates at least one layer of the CB product with other non-CB materials to impart improved properties to those other non-CB materials. For example, buckypaper and composites made with buckypaper have displayed a shape memory property under thermal, mechanical, electrical, magnetic, light or chemical activation conditions, and this property can be imparted into laminate products that incorporate one or more layers of the CB product and one or more layers of non-CB material. This shape memory effect is promoted by the incorporation of anisotropic properties in the CB product, as described above. Furthermore, the electrical and thermal conductivity of the CB product may provide superior properties when used in heating element or radiator applications.

Other applications of the CB buckypaper product that make specific use of the superior CNM properties of the carbanogel include, but are not limited to: (a) light-weight tooling application for high speed, safety, and quick changes; (b) tools that are harder for better drilling, impact, and/or sawing; (c) tools with better thermal management; (d) ultra-strong, foldable materials; (e) as precursors to fibers and textiles; (e) as a dense storage packet for transport and delivery of CNMs and for the general sequestration of $CO_2$; (f) an ultra-light, ultra-absorbent sponge; (g) as pre-made laminate sheet for composites; (h) for ballistic or EMF shielding; (j) to make composites with high amount of CNMs by infiltrating pores in structure; (k) parachutes and drag enhancers; (l) for studying the bulk properties of carbon nanomaterials.

Other uses of the CB product made according to the embodiments of the present disclosure include products that combine the advantage of two or more superior CNM properties such as: structural materials that provide dual usage additionally reducing weight, material costs/used, and/or increasing capacity, such as for but not limited to: (i) structure and electrical energy storage, or (ii) structure and thermal energy storage; (iii) for structure and as an electrical conduit or wire; (iv) for structure and as strain or safety sensors to collect real time data on the material performance; (v) for structure and serve as catalyst; (vi) for structure and as a thermal conduit. Also, there are applications and uses of CB products made according to the embodiments of the present disclosure to increase safety by being used in a heat dispersing member for dispersing high heat, such as in applications where fire is a concern.

We claim:

1. A method for preparing a carbanogel buckypaper (CB) product, the method comprising steps of:
   a. receiving a carbanogel made by an electrolytic process for splitting of carbon dioxide ($CO_2$) within a molten electrolyte, wherein the carbanogel comprises carbon nanomaterials (CNM) and the molten electrolyte, either cooled or not cooled;
   b. positioning the carbanogel in a mold;
   c. compressing the carbanogel to form the CB product.

2. The method of claim 1, wherein the step of positioning follows the step of receiving the carbanogel at a temperature above a melting point of an electrolyte, wherein the molten electrolyte comprises the electrolyte.

3. The method of claim 1, wherein the step of positioning follows the step of receiving the carbanogel at a temperature below a melting point of the electrolyte, wherein the molten electrolyte comprises the electrolyte.

4. The method of claim 1, wherein the step of positioning follows a step of processing the carbanogel.

5. The method of claim 4, wherein the step of processing comprises one or more of:
   cooling the carbanogel;
   extracting the carbanogel, either cooled or not cooled; and
   crushing the carbanogel, either cooled or not cooled.

6. The method of claim 1, wherein the step of compressing is repeated.

7. The method of claim 1, wherein the step of compressing comprises applying a pressure between 1 pound per square inch (psi) and 2,000 psi.

8. The method of claim 1, wherein the step of compressing comprises applying a pressure of greater than about 2000 psi.

9. The method of claim 1, further comprising a step of reducing an amount of the molten electrolyte within the carbanogel.

10. The method claim 9, wherein the step of reducing comprises pressing, reacting, washing, filtering and any combination thereof.

11. The method of claim 1, wherein the CNM comprises spherical nanocarbon, solid nano-onions, hollow nano-onions, nanocarbon of cylindrical allotropes, nanocarbon of planar allotropes, nanocarbon of helical allotropes, carbon nanotubes (CNTs), nanofibers, graphene, nano-platelets, nano-scaffolds, nano-trees, nano-belts, nano-flowers, nano-dragon, nano-trees, nano-rods, surface modified or metal coated CNMs, amorphous nanocarbon without graphitic characteristics, amorphous nanocarbon without graphitic properties and any combination thereof.

12. The method of claim 1, further comprising a step of applying heat before, during or after a step of applying pressure, wherein the heat is between 0° C. and 1000° C.

13. The method of claim 12, further comprising a step of aligning the CNM by applying an alignment force before, during or after the step of applying pressure.

14. The method of claim 13, wherein the alignment force is a mechanical force, an electrical current, a magnetic field and any combinations thereof.

15. The method of claim 13, wherein the alignment force is of a radial geometry, a cylindrical geometry, a spherical geometry or other geometry to produce a linear, radial, cylindrical, spherical or other directional geometry for imparting one or more anisotropic properties into the CB product.

16. The method of claim 1, further comprising a step of applying a void-filling agent for partially or substantially fully filling voids in the carbanogel, the CB product or both.

17. The method of claim 16, wherein the void-filling agent is a strengthener, a catalyst, a dopant, a magnetic material, a medicine, an electromagnetic force shielding agent or combinations thereof.

18. The method of claim 17, wherein the strengthener comprises an epoxy, a resin, another polymer, a cementitious material, a metal, an alloy and any combination thereof.

19. The method of claim 17, wherein the catalyst comprises an epoxy, a resin, other polymers, a cementitious material, a metal, an alloy and any combination thereof.

20. The method of claim 17, wherein the dopant comprises boron, nitrogen, sulfur, phosphorous, cobalt, aluminum, silicon, cerium, platinum, gold, ruthenium, osmium, tellurium, tungsten, a respective oxide, a respective salt and any combination thereof.

21. The method of claim 17, wherein the magnetic material is iron, nickel, cobalt, gadolinium, samarium, neodymium, steel, respective carbides, other alloys comprising one or more magnetic materials with ferromagnetic properties, paramagnetic properties, diamagnetic properties and any combination thereof.

22. The method of claim 1, further comprising a step of applying heat before, during or after a step of applying pressure, wherein the heat is between 15° C. and 900° C.

23. The method of claim 1, further comprising a step of applying heat before, during or after a step of applying pressure, wherein the heat is between 399° C. and 850° C.

* * * * *